S. Waterman,
Steam Safety Valve.

Nº 9,907.  Patented Aug. 2, 1853.

UNITED STATES PATENT OFFICE.

STEPHEN WATERMAN, OF WILLIAMSBURG, NEW YORK.

MODE OF OBVIATING THE DANGER FROM STEAM-BOILER EXPLOSIONS.

Specification of Letters Patent No. 9,907, dated August 2, 1853.

*To all whom it may concern:*

Be it known that I, STEPHEN WATERMAN, of Williamsburg, in the county of Kings and State of New York, have invented certain new and useful Improvements in the Means of Obviating the Danger of Explosions in Steam-Boilers; and I do hereby declare that the following is a full, clear, and exact description of the same, reference being had to the accompanying drawings, forming part of this specification, in which—

Figure 2:
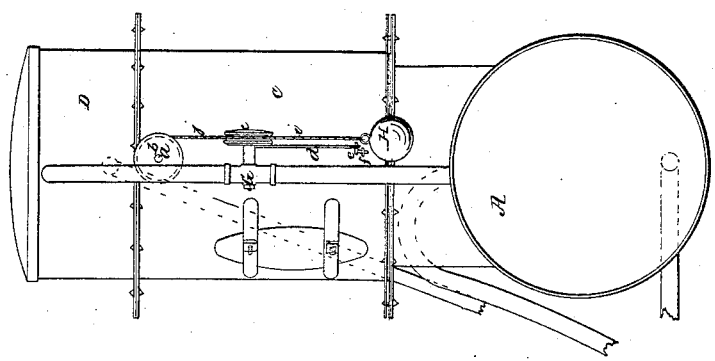
Figure 1:
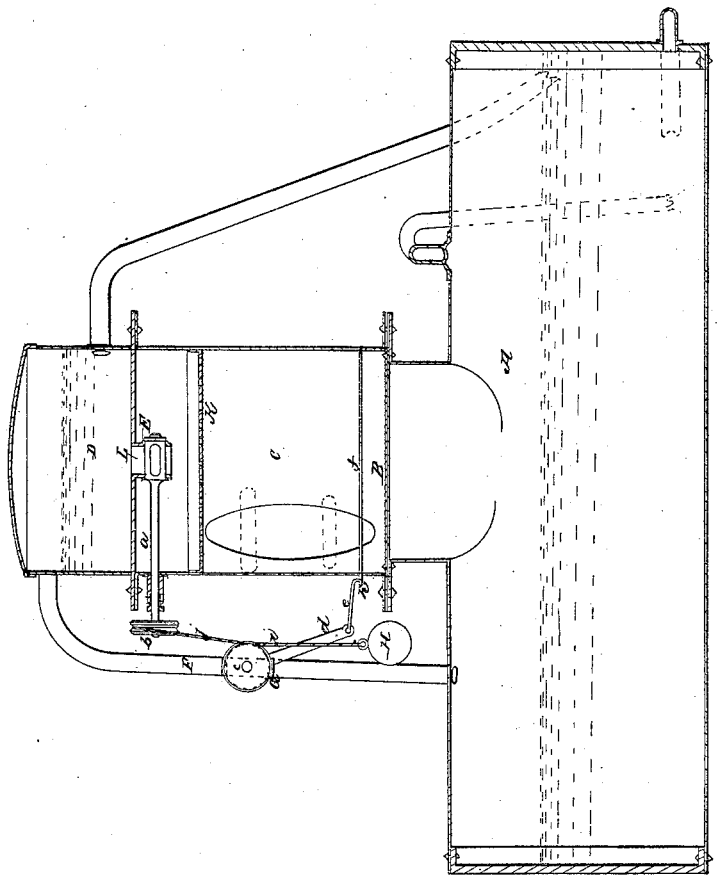

Figure 1, is a longitudinal vertical section of a horizontal cylinder-boiler, with my improvements applied. Fig. 2, is an end view of the same.

Similar letters of reference indicate corresponding parts, in both figures.

In the safety apparatus of Henry Waterman, for which Letters-Patent of the United States were issued on the 28th day of December, 1852, the danger of explosion is obviated, by the steam, when it reaches a certain pressure, bursting what is termed a "safety-plate," and being allowed to expand and partly condense in what is termed a "safety-chamber"; and thus its pressure is reduced, and the boiler relieved of undue strain. In order to make this apparatus perfectly effective, the safety-chamber must be of very considerable capacity.

My invention has for its object, the reduction of the size of the safety-chamber; and this I accomplish without, in any degree, diminishing its effect.

The nature of my invention consists in the combination, with the safety-chamber and safety-plate, of a cold water reservoir, which has communication at its lower part with the safety-chamber, and at its upper part with the steam space of the boiler, which said communications are closed when the boiler is in proper operation, but are caused to open by the bursting of the safety-plate. The reservoir contains such a quantity of cold water as would, when admitted to the safety-chamber or steam space of the boiler, condense the steam and reduce its pressure to the degree considered desirable for safety, and it is placed in such a position that, if the pressure above the water in the reservoir, be made the same as that in the boiler,— the proper communication being open,—the water will descend into the boiler or safety-chamber, by its gravity. When the plate bursts, and both communications are thereby caused to open, the steam from the boiler is admitted to the reservoir; and, the pressure above and below being equalized, the water is caused to descend into the chamber or boiler.

To enable those skilled in the art to make and use my invention, I will proceed to describe its construction and operation.

A, represents the boiler; B, the safety-plate; and C, the safety chamber.

D, is the cold water reservoir, which is placed immediately above the safety chamber, and is by the latter protected from the heat of the boiler, and the water within it is thereby kept at a low temperature. There is a communication between the bottom of the reservoir and the safety chamber, at L, which is opened and closed by a cock, E, which is turned by a spindle, *a*, which passes through to the exterior of the chamber, where it is furnished with a pulley, *b*. There is also a communication between the upper part of the reservoir and the steam space in the boiler, through a pipe, F, which is opened and closed by a cock, G, whose plug is furnished with a pulley, *c*, and also with a lever, *d*, both secured firmly to it. The lever is furnished with a hook, *e*, by which it can be attached to a wire, *f*, which passes through the chamber, a short distance above the safety plate, and is secured to the opposite side, at *g*. This wire has a shoulder at the end, *h*, by which it is prevented being drawn into the chamber; but the part within the shoulder fits easily to an opening in the chamber. When the hook, *e*, is connected with the wire, *f*,—as it always is when the boiler is in proper operation,— the cock, G, closes the pipe, F; but a constant tendency to open the cock, is produced by a weight, H, suspended from a cord or chain, *i*, which is attached to, and passes some distance around, the pulley, *c*. The cock, E, is kept closed, when the boiler is in proper operation; but its pulley, *b*, has a cord or chain, *j*, attached to its periphery, and connected either with the pulley, *c*, weight, H, or cord or chain, I, in such a way that, if the tendency of the weight, H, to open G, is allowed to take effect, E, would also be opened. The wire, *f*, should be of a strength but little greater than is necessary to overcome the tendency of the weight, H, to open the cocks, G, and E; and, when the safety plate is torn apart, it will come in contact with, and break the wire, *f*, leaving the part which is not attached, at, *g*, free to be drawn outward by the hook, *e*, and hence leaving the weight, H, free to descend, which it will immediately do, and open both the cocks, admitting the steam at the top of the water-reservoir, and allowing the water to descend therefrom into the safety chamber. A spreader, *k*, similar to what is used in condensers, is placed across the upper part of the safety chamber, to distribute the water well among the steam; and condensation and diminution of pressure are caused to take place immediately after the opening of the cocks. The expansion of the steam in the safety-chamber, and the condensation caused by its coming in contact with the cold surface of the same, are also auxiliary in reducing the pressure.

Having thus described my invention, I do not confine myself to placing the cold water reservoir on the top of the safety chamber, as it may be placed in other positions, and, instead of communicating with the safety chamber, may communicate with the steam space of the boiler. Nor do I confine myself to the particular mechanical means by which the tearing apart of the safety plate is made to open the communications between the water-reservoir and the boiler and safety chamber. But,

What I claim as my invention, and desire to secure by Letters Patent, is,—

The combination, with the safety-chamber and safety plate, of a cold water reservoir, D, which has means of communication, L, at the lower part, with the safety chamber or steam space in the boiler, and, F, at the upper part, with the steam space in the boiler, which said means of communication are closed, when the boiler is in proper operation, by cocks, E, and, G, or their equivalents, which are caused to open by the tearing apart of the safety plate; in any manner substantially as described, for producing the effect herein fully set forth.

STEPHEN WATERMAN.

Witnesses:
S. H. WALES,
L. F. COHEN.